United States Patent
Akourtam et al.

(10) Patent No.: US 12,409,820 B2
(45) Date of Patent: Sep. 9, 2025

(54) BRAKING SYSTEM FOR A MOTOR VEHICLE

(71) Applicant: HITACHI ASTEMO FRANCE, Drancy (FR)

(72) Inventors: Samy Akourtam, Bagneux (FR); Carlos Eduardo Ramirez Hernandez, Issy les Moulineaux (FR); Dimitri Delmeire, Franconville (FR); Abdessamed Ramdane, Beauvais (FR)

(73) Assignee: HITACHI ASTEMO FRANCE (FR)

( * ) Notice: Subject to any disclaimer, the term of this patent is extended or adjusted under 35 U.S.C. 154(b) by 111 days.

(21) Appl. No.: 18/279,918

(22) PCT Filed: Mar. 3, 2022

(86) PCT No.: PCT/EP2022/055427
§ 371 (c)(1),
(2) Date: Sep. 1, 2023

(87) PCT Pub. No.: WO2022/184838
PCT Pub. Date: Sep. 9, 2022

(65) Prior Publication Data
US 2024/0149847 A1     May 9, 2024

(30) Foreign Application Priority Data
Mar. 3, 2021 (FR) ...................................... 2102051

(51) Int. Cl.
*B60T 8/88* (2006.01)
*B60T 8/92* (2006.01)
*B60T 13/74* (2006.01)

(52) U.S. Cl.
CPC ................ *B60T 8/885* (2013.01); *B60T 8/92* (2013.01); *B60T 13/741* (2013.01); *B60T 2270/402* (2013.01); *B60T 2270/403* (2013.01)

(58) Field of Classification Search
CPC .......... B60T 8/885; B60T 8/92; B60T 13/741; B60T 13/10; B60T 13/588; B60T 13/66;
(Continued)

(56) References Cited

U.S. PATENT DOCUMENTS 12,097,833 B2 * 9/2024 Yokoyama ............ B60T 13/662
2020/0114891 A1 4/2020 Pasquet

FOREIGN PATENT DOCUMENTS

DE 102009046238 A1 5/2011
DE 102011084534 A1 4/2012
(Continued)

*Primary Examiner* — Hai H Huynh
(74) *Attorney, Agent, or Firm* — Dilworth IP, LLC (57) ABSTRACT

A braking system for a motor vehicle including a main braking circuit, an auxiliary electric braking circuit configured to perform parking braking, a first electronic control device which controls i) the main braking circuit to actuate a first braking member and a second braking member, and ii) in the auxiliary electric braking circuit, a first electric actuator of the first braking member, and a second electronic control device which controls, in the auxiliary electric braking circuit, a second electric actuator of the second braking member. A motor vehicle including such a braking system and to methods for controlling such a braking system.

15 Claims, 3 Drawing Sheets

(58) Field of Classification Search
CPC .............. B60T 13/74; B60T 2270/403; B60T 2270/402; B60T 2270/40; B60T 2270/406; B60T 2270/413; B60T 7/04; B60T 7/08; B60T 7/12; B60T 7/02; B60T 11/10; B60T 17/221
USPC ........................................................ 701/70
See application file for complete search history.

(56) References Cited

FOREIGN PATENT DOCUMENTS

| | | |
|---|---|---|
| DE | 102017218488 A1 | 4/2019 |
| DE | 102018212637 A1 | 1/2020 |
| DE | 112018005541 T5 | 6/2020 |
| FR | 2755416 A1 | 5/1998 |
| FR | 2843341 A1 | 2/2004 |
| FR | 2936306 A1 | 3/2010 |
| FR | 3023814 A1 | 1/2016 |
| WO | 2018229411 A1 | 12/2018 |
| WO | 2020128358 A1 | 6/2020 |

\* cited by examiner

BRAKING SYSTEM FOR A MOTOR VEHICLE

FIELD OF THE INVENTION

The invention relates to the field of motor vehicle braking.

BACKGROUND OF THE INVENTION

The state of the art already describes a braking system for a motor vehicle comprising for example a main hydraulic braking circuit, an auxiliary electric braking circuit and a manual braking member.

The main hydraulic braking circuit is for example controlled by an electronic control device, also called an electric brake booster, used to boost the hydraulic braking pressure by reducing the pressure to be applied during a manual braking control by pressing a brake pedal or during an automatic braking control from a motor vehicle driving management control unit, such as for example in the case of an autonomous vehicle. The hydraulic braking circuit controls hydraulic actuators of braking members, such as hydraulic pistons.

The auxiliary electric braking circuit performs a function of electric parking brake, and even preferably of automatic parking brake. This auxiliary electric braking circuit controls electric actuators of braking members.

The hydraulically and/or electrically actuated braking members are configured to brake the wheels of the motor vehicle. To do this, each braking member comprises for example a brake calliper comprising friction means, such as for example brake pads, which it presses towards braking elements that are each attached to a wheel of the vehicle, such as for example brake discs. For example, the electric parking brake function of the auxiliary electric braking circuit is activated, respectively deactivated, by pressing an activation button.

The manual braking member consists for example of a pedal and/or a lever, and exerts a direct action on braking members, consisting for example of a hand brake via a brake cable. In a complementary manner, to perform a parking brake function, the manual braking member exerts an action on the gearbox of the motor vehicle, like a parking pawl on an automatic gearbox or engagement of a gear on a manual gearbox.

In addition, the electronic control device is for example configured to control the hydraulic braking circuit, not only to perform the main hydraulic braking function of the motor vehicle, but also to perform some dynamic braking functions, such as the anti-lock braking system, also known by the acronym ABS for "Antiblokiersystem" in German, or the Electronic Stability Program, known by the acronym ESP, or Electronic Stability Control, known by the acronym ESC.

In the event of failure of the main hydraulic braking circuit, the manual braking member can be used to perform emergency dynamic braking—also called driving braking. In the event of failure of the auxiliary electric braking circuit, the manual braking member can also be used to perform emergency parking braking. Such a manual braking member thus guarantees redundancy in the braking system, thereby increasing safety. However, some motor vehicles, for example autonomous motor vehicles, do not necessarily comprise such a manual braking member.

SUMMARY OF THE INVENTION

The invention aims to provide a braking system for a motor vehicle to automatically obtain emergency parking braking, or even emergency driving braking, in the event of failure of the braking systems, regardless of whether or not a manual braking member is present.

The invention therefore relates to a braking system for a motor vehicle, comprising:
- a main braking circuit,
- an auxiliary electric braking circuit configured to perform parking braking,
- a first electronic control device which controls
  i) the main braking circuit to actuate a first braking member and a second braking member, and
  ii) in the auxiliary electric braking circuit, a first electric actuator of the first braking member, and
- a second electronic control device which controls, in the auxiliary electric braking circuit, a second electric actuator of the second braking member.

Thus, in the event of failure of the auxiliary electric circuit due to a failure of the first electronic control device or of the second electronic control device, such a braking system guarantees the electrical actuation of a braking member. Thus, there is no need to necessarily provide a manual braking member, which is particularly interesting in the case of an autonomous vehicle. The auxiliary electric braking circuit guarantees in fact parking braking even in the event of a failure of the first electronic control device or of the second electronic control device, and can even be used to act as an emergency driving brake in the event of a failure of the main braking circuit.

Note that it is particularly interesting to remove the need for a manual braking member in the system proposed, for example such as a parking pawl on an automatic gearbox, since this reduces the cost of the braking system.

According to other optional characteristics of the braking system, taken alone or in combination:

- The first electronic control device controls actuators of the main braking circuit, which actuate the first and second braking members. For example, each braking member comprises a brake calliper comprising friction means, such as for example brake pads, which it presses towards a rotor, such as a braking element that is attached to a wheel of the motor vehicle, for example a brake disc. For example, each actuator of the main braking circuit comprises a hydraulic piston driving a brake calliper.
- The braking system, via the actuators of the main braking circuit and the first and second electric actuators, drives the first and second braking members.
- Each braking member comprises friction means with a rotor, such as a braking element attached to a wheel of the motor vehicle, preferably the friction means being brake pads and the braking element being a brake disc.
- The first electronic control device converts a braking control into control quantities for the actuators of the main braking circuit and the first electric actuator, even for the second electric actuator.
- The control quantities are adapted to the actuators and are selected from the group comprising electrical signals, hydraulic pressure quantities and pneumatic pressure quantities.
- The second electronic control device converts a braking control into electrical signals for the second electric actuator, even for the first electric actuator.
- The braking control is a manual control from a driver or an automatic control from a motor vehicle driving management control unit. The case of an automatic control is extremely interesting for an autonomous vehicle.

The first electronic control device controls the main braking circuit to also actuate a third braking member and a fourth braking member.

The first electronic control device comprises an electric motor actuating a master cylinder in the main braking circuit, the electric motor being controlled by the first electronic control device.

The braking system comprises:
a first switch comprising a primary input connected to the first electronic control device and an output connected to the first electric actuator of the first braking member, the first switch comprising an emergency input connected to the second electronic control device, the first switch being configured to connect, in the event of failure of the first electronic control device, the second electronic control device to the first electric actuator of the first braking member, and
a second switch comprising a primary input connected to the second electronic control device and an output connected to the second electric actuator of the second braking member, the second switch comprising an emergency input connected to the first electronic control device, the second switch being configured to connect, in the event of failure of the second electronic control device, the first electronic control device to the second electric actuator of the second braking member.

Thus, in the event of failure of the first electronic control device, electric braking is fully maintained by switching the first electric switch from the first electronic control device to the second electronic control device. In the event of failure of the second electronic control device, electric braking is fully maintained by switching the second electric switch from the second electronic control device to the first electronic control device. Thus, electric braking is achieved in a particularly safe manner, especially parking braking which can then keep a vehicle parked on a slope of up to 30%, in particular since the parking braking is guaranteed on at least two wheels of the motor vehicle, due to the combination of two electrically actuated braking members. This provides redundancy of the parking brake function and therefore improves the safety of the motor vehicle regarding parking braking. In normal operation, the parking brake function is preferably performed automatically, by being activated as soon as the ignition of the motor vehicle is switched off or when doing a hill start. Thus, the braking system performs an automatic parking brake function. In this case, even in the event of failure of the first electronic control device or of the second electronic control device, the automatic parking brake function is nevertheless performed in an optimum manner, for example due to the fact that in this case, the dynamic braking management and stability control function remains operational.

The first switch and the second switch are formed in the same electronic component. Thus, the braking system comprises fewer separate components, it is compact and easy to assemble.

The first switch and the second switch are arranged on separate electronic boards. Thus, the braking system is more reliable, since a failure of one of the electronic boards does not affect the other electronic board.

The first electronic control device controls the first electric actuator and the second electronic control device controls the second electric actuator, to selectively perform parking braking and emergency driving braking. Thus, the auxiliary electric braking circuit guarantees a parking brake function and performs an emergency driving brake function. "Driving" means the action according to which the motor vehicle is moving, preferably at a speed of more than 6 km/h. In this case, the term "driving" is the opposite of parking the motor vehicle, or even a motor vehicle which is getting ready to stop spontaneously due to friction between the roadway and the wheels of the motor vehicle. Thus, in normal operation, the auxiliary electric circuit performs only the parking brake function, and in the event of failure of the main braking circuit, it performs the emergency driving brake function. This provides redundancy of the driving brake function and therefore improves the safety of the motor vehicle regarding driving braking. In normal operation, the parking brake function is preferably performed automatically, by being activated as soon as the ignition of the motor vehicle is switched off, when the engine of the motor vehicle is stopped, or when doing a hill start. Thus, the braking system performs an automatic parking brake function, preferably when the speed of the motor vehicle is less than 6 km/h.

The first braking member is configured to brake a first wheel of the motor vehicle, and the second braking member is configured to brake a second wheel of the motor vehicle different from the first wheel, the first and second wheels preferably being the rear wheels of the motor vehicle. Thus, braking is performed, in particular parking braking, even in the event of a failure of the braking system, for example if the first or the second electronic control device is defective. Parking braking is for example guaranteed, even when the vehicle must be parked on a slope of up to 8%, due to the fact that the braking is guaranteed on at least one wheel of the motor vehicle.

The braking system comprises a third braking member and a fourth braking member that are actuated by the main braking circuit. They are preferably configured to each brake one wheel, in other words a third wheel and a fourth wheel, which are the front wheels of the vehicle.

The first electronic control device and the second electronic control device each comprise a processing unit for processing signals representative of the speed of rotation of the wheels of the motor vehicle, and a dynamic braking management and electronic stability control unit. Thus, the first electronic control device and the second electronic control device can each perform a braking system operation control function and a dynamic braking management and stability control function. These functions are for example selected from the group comprising the anti-lock braking function, the electronic stability program function, the automatic parking braking function.

The braking system comprises a rotation speed sensor on each wheel of the motor vehicle. Thus, the signals representative of the speed of rotation of the wheels of the motor vehicle are obtained from these sensors.

The main braking circuit is a hydraulic braking circuit which comprises a hydraulic actuator for each braking member. Alternatively, the main braking circuit is an electric braking circuit which comprises an electric actuator for each braking member, these electric actuators being different from the first electric actuator and the second electric actuator. Again alternatively, the main braking circuit is a pneumatic braking circuit which comprises a pneumatic actuator for each braking member.

The braking system further comprises a manual control device for controlling the main braking circuit, the first electronic control device being configured to assist the manual control device by supplying additional hydraulic pressure in the main braking circuit when the manual control device is actuated by a manual braking control by a driver. Thus, the braking system can be used to easily perform braking via a manual control, for example if the motor vehicle is not in an autonomous mode.

The additional hydraulic pressure is supplied by an electric motor actuating a master cylinder in the main braking circuit, the electric motor being controlled by the first electronic control device. Such an arrangement thus forms an electric brake booster.

The manual control device comprises a pedal or a lever, which preferably actuates a master cylinder in the main braking circuit.

The braking system comprises a data communication bus between the first electronic control device and the second electronic control device. Thus, the first electronic control device and the second control device exchange data between each other, which optimises the braking.

The data communication bus is a multiplexed type, preferably CAN type and preferably has a data transmission speed of at least 500 kbit/s. Thus, good synchronisation can be obtained between the first electronic control device and the second electronic control device, to allow correctly synchronised braking.

The braking system comprises an analogue link connecting the first and second electric switches to the first and second electronic control devices. Thus, the first electronic control device and the second electronic control device are connected to the first and second electric switches. This allows the latter to easily control the first and second electric switches during a failure of the first electronic control device or of the second electronic control device. Alternatively, it is the data communication bus which connects the first and second electric switches to the first and second electronic control devices. Thus, the first electronic control device and the second electronic control device are connected to the first and second electric switches. This allows the first electronic control device, respectively the second electronic control device, to easily control the first and second electric switches during a failure of the second electronic control device, respectively of the first electronic control device.

The second electronic control device is configured to detect a failure of the first electronic control device and the first electronic control device is configured to detect a failure of the second electronic control device.

The first and second electronic control devices each comprise a monitoring electronic unit, which is configured to detect a failure of the main braking circuit, preferably using signals representative of the speed of rotation of the wheels of the motor vehicle.

The first electronic control device and the second electronic control device are independent. Thus, the failure of one electronic control device does not lead to the failure or downgraded operation of the other electronic control device.

The second electronic control device controls only the auxiliary braking circuit. Thus, the braking system is produced with an optimised design.

The second electronic control device does not control the main braking circuit. Thus, the main braking circuit is not made more complex and, consequently, the braking system can be produced with an optimised design.

The invention also relates to a motor vehicle, preferably autonomous, comprising a braking system as described previously.

The invention further relates to a control method for controlling a motor vehicle as described previously or a braking system as described previously, wherein during a braking control step:
when a failure of the main braking circuit is detected, the first electronic control device applies a step of emergency control of the first electric actuator and the second electronic control device applies a step of emergency control of the second electric actuator.

According to an optional characteristic of the control method:
The step of detecting a failure of the main braking circuit is performed by the first electronic control device and/or by the second electronic control device.

The invention further relates to a control method as described previously, or a control method for controlling a motor vehicle as described previously or for controlling a braking system as described previously, wherein during a braking control step:
when a failure of the first electronic control device is detected, the second electronic control device applies a step of emergency control of the first electric actuator,
when a failure of the second electronic control device is detected, the first electronic control device applies a step of emergency control of the second electric actuator.

According to other optional characteristics of the control method, taken alone or in combination:
The step of detecting a failure of the first electronic control device is performed by the second electronic control device.
The step of detecting a failure of the second electronic control device is performed by the first electronic control device.

BRIEF DESCRIPTION OF THE FIGURES

The invention will be better understood on reading the following description, given solely by way of example and with reference to the accompanying drawings in which.

DETAILED DESCRIPTION

On all the figures, the same references refer to the same elements.

In this detailed description, the following embodiments are examples. Although the description refers to one or more embodiments, this does not mean that the characteristics apply only to a single embodiment. Simple characteristics of different embodiments may also be combined and/or interchanged to provide other embodiments.

In this description, some elements or members are designated by names or expressions, such as for example "first brake member" or "second brake member". In this case, these designations are used to differentiate and name elements or members that are not identical. These designations do not imply a priority or a hierarchy of one element (or member) over another and it is quite possible to interchange such names without departing from the scope of this description. Similarly, these designations do not imply an order in time for example to appreciate such or such criteria.

Figure 1:
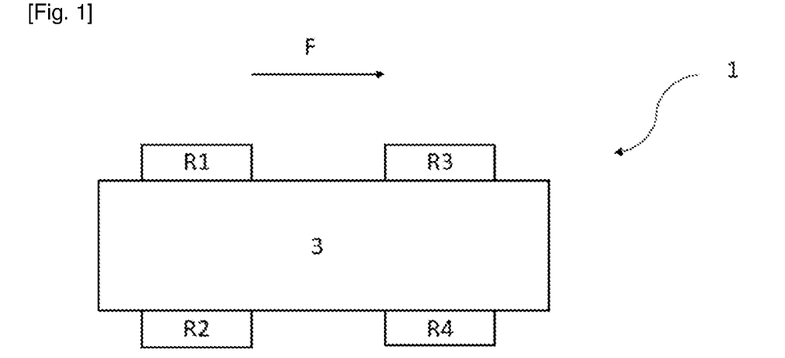
FIG. 1 is a diagrammatic view of a motor vehicle comprising a braking system.

FIG. 1 is a diagrammatic representation of a motor vehicle 1, for example autonomous, comprising a braking system 3 and four wheels R1, R2, R3, R4. Two wheels R1, R2 are the rear wheels, and two wheels R3, R4 are the front wheels, considered in the normal direction of forward movement of the motor vehicle 1, represented by the arrow F.

Figure 2:
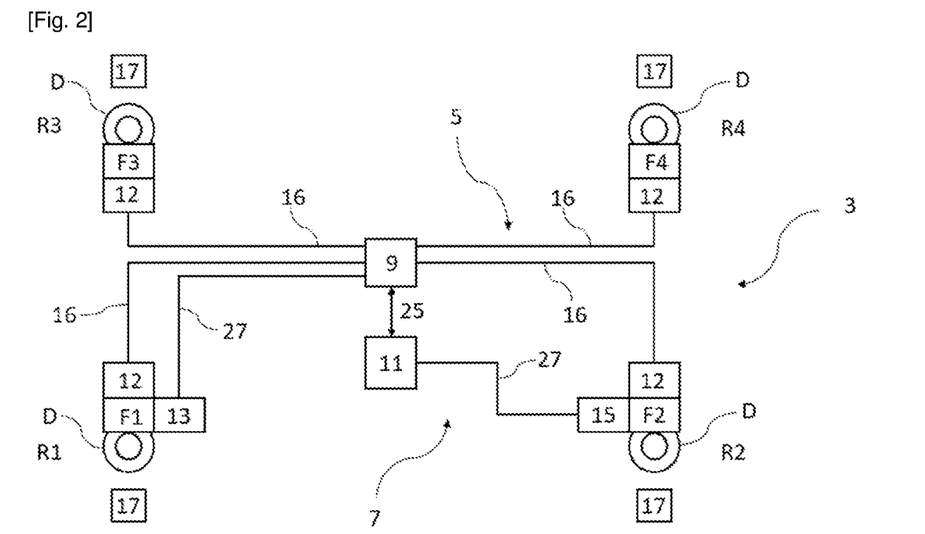
FIG. 2 is a diagrammatic view of a braking system according to a first embodiment.

FIG. 2 is a diagrammatic representation of a braking system 3 according to a first embodiment. The braking system 3 comprises a main braking circuit 5 and an auxiliary electric braking circuit 7. The auxiliary electric braking circuit 7 is configured to perform parking braking. The braking system 3 further comprises a first electronic control device 9 and a second electronic control device 11. The first electronic control device 9 and the second electronic control device 11 are separate components in the braking system 3. In other words, the first electronic control device 9 and the second electronic control device 11 are independent.

In this example, the braking system 3 comprises a first braking member F1, a second braking member F2, a third braking member F3 and a fourth braking member F4. The first braking member F1 is configured to brake the rear wheel R1, the second braking member F2 is configured to brake the rear wheel R2, the third braking member F3 is configured to brake the front wheel R3 and the fourth braking member F4 is configured to brake the front wheel R4. The first electronic control device 9 controls the main braking circuit 5 to actuate the first braking member F1 and the second braking member F2. To this end, the first electronic control device 9 controls actuators 12 of the main braking circuit 5, which actuate the first braking member F1, the second braking member F2, the third braking member F3 and the fourth braking member F4. Each braking member F1-F4 comprises a brake calliper comprising friction means, such as for example brake pads, which it presses towards a rotor, such as a braking element D that is attached to a wheel R1-R4 of the motor vehicle, for example a brake disc. In this example, the braking system 3 is a hydraulic braking circuit which comprises a hydraulic actuator 12 for each braking member F1-F4. For example, each actuator 12 of the main braking circuit 5 comprises a hydraulic piston driving a brake calliper. The first electronic control device 9 comprises an electric motor 31 actuating a master cylinder 33 in the main braking circuit 5, the electric motor 31 being controlled by the first electronic control device. The main braking circuit 5 thus comprises hydraulic pipes 16 connecting the master cylinder 33 of the first electronic control device 9 to the actuators 12.

In another variant, the main braking circuit 5 is an electric braking circuit which comprises an electric actuator 12 for each braking member F1-F4, these electric actuators 12 being different from electric actuators of the auxiliary electric braking circuit 7. In another variant, the main braking circuit 5 is a pneumatic braking circuit which comprises a pneumatic actuator 12 for each braking member F1-F4.

The auxiliary electric braking circuit 7 comprises a first electric actuator 13 of the first braking member F1 and a second electric actuator 15 of the second braking member F2. The first electronic control device 9 controls, in the auxiliary electric braking circuit 7, the first electric actuator 13 of the first braking member F1. Thus, the first electronic control device 9 converts a braking control into control quantities for the actuators 12 of the main braking circuit 5 and the first electric actuator 13. The braking control is a manual control from a driver or an automatic control from a motor vehicle driving management control unit. The control quantities are adapted to the actuators and are selected from the group comprising electrical signals, hydraulic pressure quantities and pneumatic pressure quantities. In this example where the braking system 3 is a hydraulic braking circuit, the control quantity for the actuators 12 is a hydraulic pressure quantity, and the control quantity for the first electric actuator 13 is an electrical signal.

The second electronic control device 11 controls, in the auxiliary electric braking circuit 7, the second electric actuator 15 of the second braking member F2. The second electronic control device 11 converts a braking control into electrical signals for the second electric actuator 15. The second electronic control device 9 controls only the auxiliary braking circuit 7. In other words, the second electronic control device 11 does not control the main braking circuit 5.

Thus, the braking system 3, via the actuators 12 of the main braking circuit 5, the first electric actuator 13 and the second electric actuator 15, drives the first braking member F1 and the second braking member F2.

The braking system 3 comprises a rotation speed sensor 17 on each wheel R1-R4 of the motor vehicle.

Figure 3:
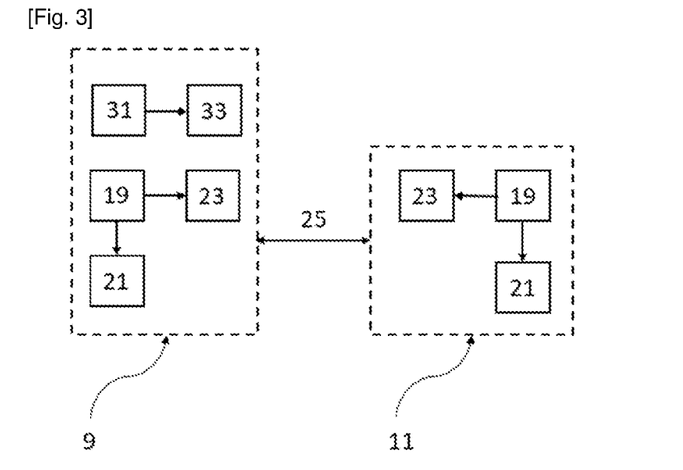
FIG. 3 is a diagrammatic view of a part of the braking system according to the first embodiment.

As shown on FIG. 3, the first electronic control device 9 and the second electronic control device 11 each comprise a processing unit 19 for processing signals representative of the speed of rotation of the wheels R1-R4 of the motor vehicle 1, a dynamic braking management and electronic stability control unit 21 and a monitoring unit 23. Thus, the first electronic control device 9 and the second electronic control device 11 can each perform a braking system operation control function and a dynamic braking management and stability control function. These functions are for example selected from the group comprising the anti-lock braking function, the electronic stability control function, the automatic parking braking function. The monitoring unit 23 is configured to detect a failure of the main braking circuit 5, preferably using signals representative of the speed of rotation of the wheels R1-R4 of the motor vehicle 1. In this example, the signals representative of the speed of rotation of the wheels R1-R4 of the motor vehicle 1 are obtained from the rotation speed sensors 17.

The first electronic control device 9 controls the first electric actuator 13 and the second electronic control device 11 controls the second electric actuator 15, to selectively perform parking braking and emergency driving braking. In normal operation, the parking brake function is preferably performed automatically, for example simultaneously by the first electronic control device 9 and the second electronic control device 11.

The braking system 3 comprises a data communication bus 25 between the first electronic control device 9 and the second electronic control device 11. The data communication bus 25 is a multiplexed type, preferably CAN type and preferably has a data transmission speed of at least 500 kbit/s.

The second electronic control device 11 is configured to detect a failure of the first electronic control device 9 and the first electronic control device 9 is configured to detect a failure of the second electronic control device 11. To do this, the monitoring unit 23 of the first electronic control device 9 is configured to detect a failure of the second electronic control device 11 by monitoring data transmitted by the second electronic control device 11 and transiting via the data communication bus 25, and the monitoring unit 23 of the second electronic control device 11 is configured to detect a failure of the first electronic control device 9 by monitoring data transmitted by the first electronic control device 9 and transiting via the data communication bus 25.

In addition, the monitoring unit 23 of the first electronic control device 9 and the monitoring unit 23 of the second electronic control device 11 are configured to detect a failure of the main braking circuit 5 by monitoring data transmitted by the rotation speed sensors 17.

The braking system 3 comprises electrical links 27 connecting the first electric actuator 13 to the first electronic control device 9 and connecting the second electric actuator 15 to the second electronic control device 11.

Figure 4:
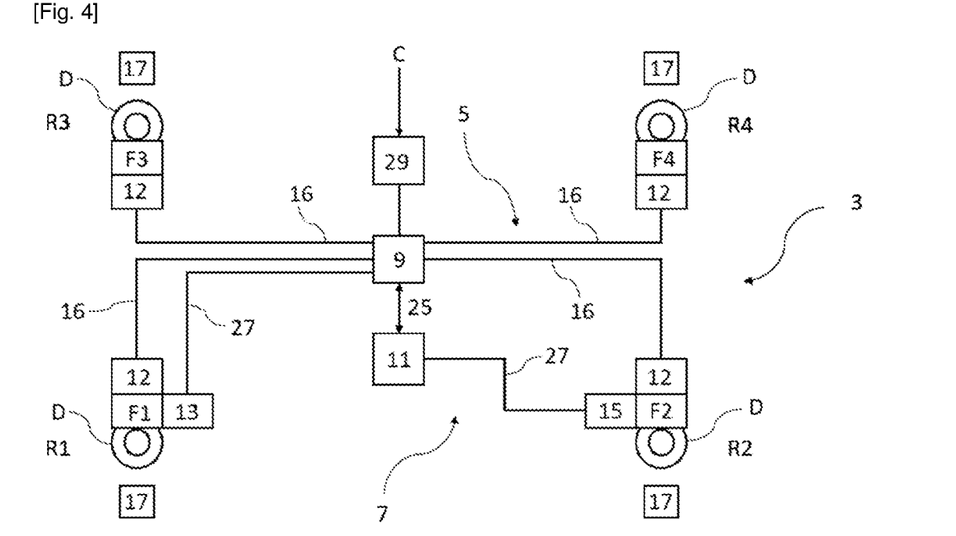
FIG. 4 is a diagrammatic view of a braking system according to a second embodiment.

FIG. 4 is a diagrammatic representation of a braking system 3 according to a second embodiment. This second embodiment differs from the first embodiment shown on FIG. 2 in that the braking system 3 further comprises a manual control device 29 for controlling the main braking circuit 5. The first electronic control device 9 is configured to assist the manual control device 29 by supplying additional hydraulic pressure in the main braking circuit 5 when the manual control device 29 is actuated by a manual braking control by a driver C. The manual control device 29 comprises a pedal or a lever, which actuates the master cylinder 33 in the main braking circuit 5. The additional hydraulic pressure is supplied by the electric motor 31 actuating the master cylinder 33 in the main braking circuit 5, the electric motor being controlled by the first electronic control device 9.

Figure 5:
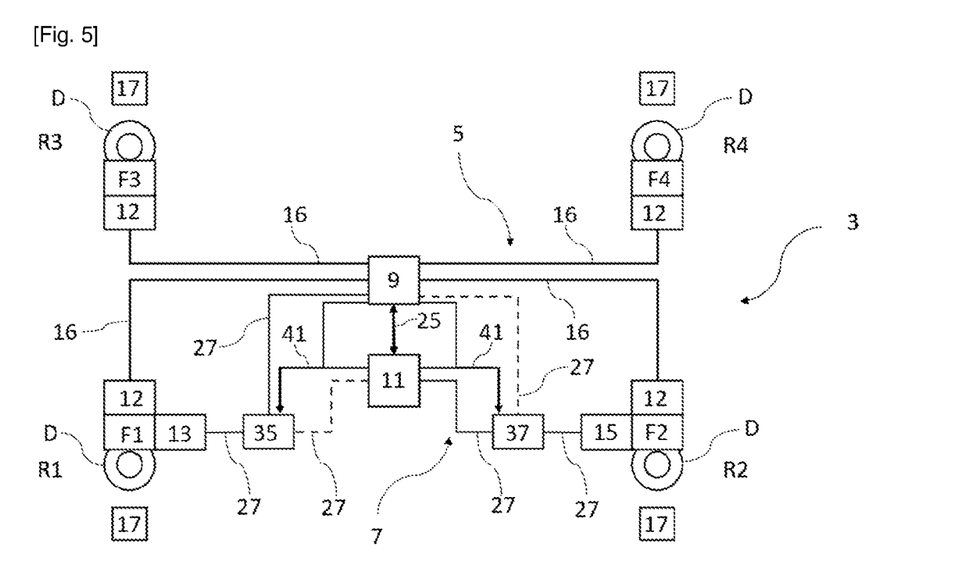
FIG. 5 is a diagrammatic view of a braking system according to a third embodiment.

FIG. 5 is a diagrammatic representation of a braking system 3 according to a third embodiment. This third embodiment differs from the first embodiment shown on FIG. 2 in that the braking system 3 comprises a first switch 35 comprising a primary input connected to the first electronic control device 9, via an electrical link 27, and an output connected to the first electric actuator 13 of the first braking member F1, via an electrical link 27. The first switch 35 comprises an emergency input connected to the second electronic control device 11, via an electrical link 27. The first switch 35 is configured to connect, in the event of failure of the first electronic control device 9, the second electronic control device 11 to the first electric actuator 13 of the first braking member F1. This braking system 3 also comprises a second switch 37 comprising a primary input connected to the second electronic control device 11, via an electrical link 27, and an output connected to the second electric actuator 15 of the second braking member F2, via an electrical link 27. The second switch 37 also comprises an emergency input connected to the first electronic control device 9, via an electrical link 27. The second switch 37 is configured to connect, in the event of failure of the second electronic control device 11, the first electronic control device 9 to the second electric actuator 15 of the second braking member F2. In this embodiment, the first switch 35 and the second switch 37 are arranged separately, in other words on separate electronic boards.

In the embodiment shown on FIG. 5, the braking system 3 comprises an analogue link 41 connecting the first switch 35 and the second switch 37 to the first electronic control device 9 and to the second electronic control device 11. Thus, the first electronic control device 9 and the second electronic control device 11 are connected to the first switch 35 and to the second switch 37, in order to switch the first switch 35 and the second switch 37 to only the first electronic control device 9 in the event of failure of the second electronic control device 11 and to only the second electronic control device 11 in the event of failure of the first electronic control device 9. Consequently, in the event of failure of the second electronic control device 11, the first electronic control device 9 also converts a braking control into control quantities for the second electric actuator 15, via the second switch 37. In the event of failure of the first electronic control device 9, the second electronic control device 11 also converts a braking control into control quantities for the first electric actuator 13, via the first switch 35.

Figure 6:
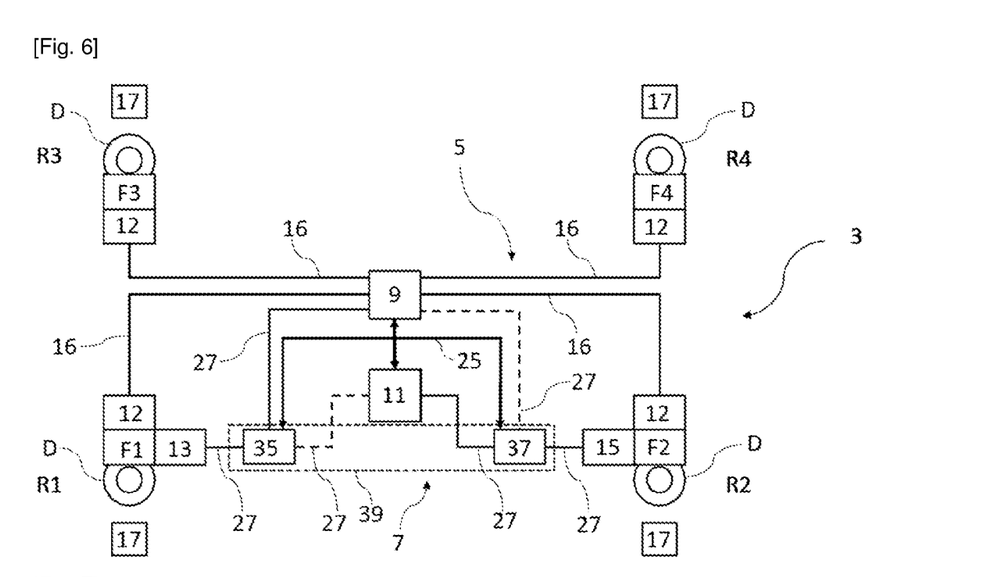
FIG. 6 is a diagrammatic view of a braking system according to a fourth embodiment.

FIG. 6 is a diagrammatic representation of a braking system 3 according to a fourth embodiment. This fourth embodiment differs from the third embodiment shown on FIG. in that instead of the analogue link 41, it is the data communication bus 25 which connects the first switch 35 and the second switch 37 to the first electronic control device 9 and to the second electronic control device 11. Thus, the first electronic control device 9 and the second electronic control device 11 are connected to the first switch 35 and to the second switch 37, in order to switch the first switch 35 and the second switch 37 to only the first electronic control device 9 in the event of failure of the second electronic control device 11 and to only the second electronic control device 11 in the event of failure of the first electronic control device 9. Consequently, in the event of failure of the second electronic control device 11, the first electronic control device 9 also converts a braking control into control quantities for the second electric actuator 15, via the second switch 37. In the event of failure of the first electronic control device 9, the second electronic control device 11 also converts a braking control into control quantities for the first electric actuator 13, via the first switch 35.

In addition, in this fourth embodiment, a different arrangement of the first switch 35 and of the second switch 37 is described. Thus, the first switch 35 and the second switch 37 are arranged on the same electronic board, and are preferably formed in the same electronic component 39.

Figure 7:
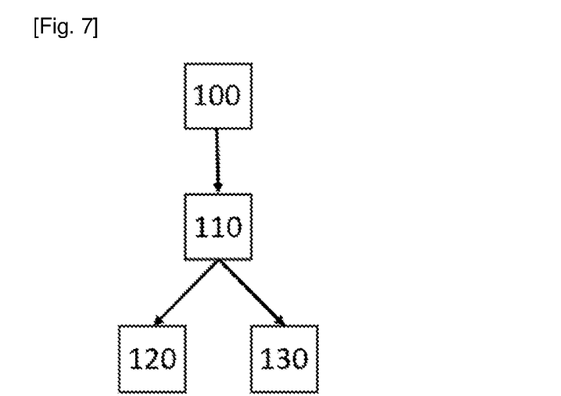
FIG. 7 is a diagram illustrating a first example of a control method.

A first example of a control method for controlling a motor vehicle 1 or a braking system 3 is described below and is illustrated on FIG. 7. Such a control method is such that, during a braking step 100, when a failure of the main braking circuit 5 is detected, the first electronic control device 9 applies a step 120 of emergency control of the first electric actuator 13 and the second electronic control device 11 applies a step 130 of emergency control of the second electric actuator 15.

In this example, the step 110 of detecting a failure of the main braking circuit 5 is performed by the first electronic control device 9 and/or by the second electronic control device 11, more precisely via the monitoring unit 23 of the first electronic control device 9 and/or via the monitoring unit 23 of the second electronic control device 11, which monitor the data transmitted by the rotation speed sensors 17.

Thus, in the event of failure of the main braking circuit 5, the first electronic control device 9 controls the first electric actuator 13 and the second electronic control device 11 controls the second electric actuator 15, to perform emergency driving braking when the braking step 100 is a driving braking step. In the event of failure of the main braking circuit 5, parking braking is still possible with normal operation, since the first electronic control device 9 controls the first electric actuator 13 and the second electronic control device 11 controls the second electric actuator 15.

Figure 8:
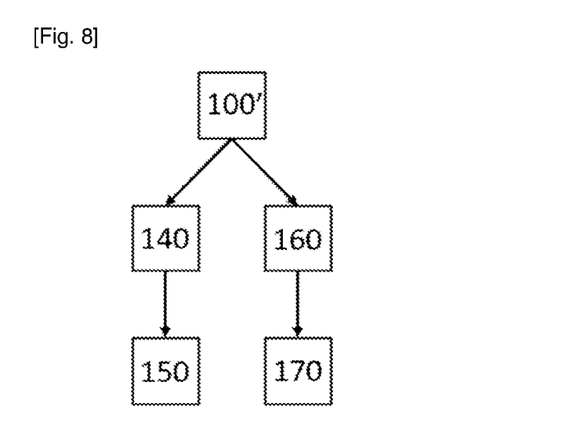
FIG. 8 is a diagram illustrating a second example of a control method.

A second example of a control method for controlling a motor vehicle 1 or a braking system 3 is described below and is illustrated on FIG. 8. Such a control method, during a braking step 100', comprises the following steps:
- when a failure of the first electronic control device 9 is detected, the second electronic control device 11 applies a step 150 of emergency control of the first electric actuator 13,
- when a failure of the second electronic control device 11 is detected, the first electronic control device 9 applies a step 170 of emergency control of the second electric actuator 15.

In this example, the step 140 of detecting a failure of the first electronic control device 9 is performed by the second electronic control device 11, more precisely via the monitoring unit 23 of the second electronic control device 11, and the step 160 of detecting a failure of the second electronic control device 11 is performed by the first electronic control device 9, more precisely via the monitoring unit 23 of the first electronic control device 9.

Thus, in the event of failure of the first electronic control device 9, the second electronic control device 11 controls the second electric actuator 15 as usual and also controls the first electric actuator 13 via the step 150 of emergency control of the first electric actuator 13. Thus, in the event of failure of the first electronic control device 9, emergency parking braking is performed, since the second electronic control device 11 controls the second electric actuator 15 and the first electric actuator 13.

Similarly, in the event of failure of the second electronic control device 11, the first electronic control device 9 controls the first electric actuator 13 as usual and also controls the second electric actuator 15 via the step 170 of emergency control of the second electric actuator 15. Thus, in the event of failure of the second electronic control device 11, emergency parking braking is performed, since the first electronic control device 9 controls the first electric actuator 13 and the second electric actuator 15.

According to a variant, the second method example is combined with the first method example. In this case, even in the event of failure of the main braking circuit 5 and of the first electronic control device 9, emergency driving braking is performed, since the second electronic control device 11 controls the second electric actuator 15 and the first electric actuator 13. In addition, even in the event of failure of the main braking circuit 5 and of the second electronic control device 11, emergency driving braking is performed, since the first electronic control device 9 controls the first electric actuator 13 and the second electric actuator 15.

The invention is not limited to the embodiments described and other embodiments will be clearly apparent to those skilled in the art. In particular, the embodiments can be combined together when this is technically feasible.

LIST OF REFERENCES

1: motor vehicle
3: braking system
5: main braking circuit
7: auxiliary electric braking circuit
9: first electronic control device
11: second electronic control device
12: actuator of the main braking circuit 5
13: first electric actuator
15: second electric actuator
16: hydraulic pipe
17: rotation speed sensor
19: processing unit
21: dynamic braking management and electronic stability control unit
23: monitoring unit
25: data communication bus
27: analogue link
29: manual control device
31: electric motor
33: master cylinder
35: first switch
37: second switch
39: electronic component
41: analogue link
R1, R2: rear wheels
R3, R4: front wheels
F1-F4: braking member
D: brake disc

The invention claimed is:

1. A braking system for a motor vehicle, comprising:
a main braking circuit,
an auxiliary electric braking circuit configured to provide parking braking,
a first electronic control device which controls
  i) the main braking circuit to actuate a first braking member and a second braking member, and
  ii) in the auxiliary electric braking circuit, a first electric actuator of the first braking member, and
a second electronic control device which controls, in the auxiliary electric braking circuit, a second electric actuator of the second braking member.

2. The braking system according to claim 1, further comprising:
a first switch comprising a first primary input connected to the first electronic control device and a first output connected to the first electric actuator of the first braking member, the first switch comprising a first emergency input connected to the second electronic control device, the first switch being configured to connect, in an event of failure of the first electronic control device, the second electronic control device to the first electric actuator of the first braking member, and
a second switch comprising a second primary input connected to the second electronic control device and a second output connected to the second electric actuator of the second braking member, the second switch comprising a second emergency input connected to the first electronic control device, the second switch being configured to connect, in an event of failure of the second electronic control device, the first electronic control device to the second electric actuator of the second braking member.

3. The braking system according to claim 1, wherein the first electronic control device controls the first electric actuator and the second electronic control device controls the second electric actuator, to selectively perform parking braking and emergency driving braking.

4. The braking system according to claim 1, wherein the first braking member is configured to brake a first wheel of the motor vehicle, and the second braking member is configured to brake a second wheel of the motor vehicle different from the first wheel.

5. The braking system according to claim 4, wherein the first and second wheels are rear wheels of the motor vehicle.

6. The braking system according to claim 1, wherein the first electronic control device and the second electronic control device each comprise a processing unit for processing signals representative of a speed of rotation of wheels of the motor vehicle, and a dynamic braking management and electronic stability control unit.

7. The braking system according to claim 1, wherein the main braking circuit is a hydraulic braking circuit which comprises a hydraulic actuator for each braking member.

8. The braking system according to claim 1, which further comprises a manual control device for controlling the main braking circuit, the first electronic control device being configured to assist the manual control device by supplying additional hydraulic pressure in the main braking circuit when the manual control device is actuated by a manual braking control by a driver.

9. The braking system according to claim 1, which comprises a data communication bus between the first electronic control device and the second electronic control device.

10. A motor vehicle, comprising the braking system according to claim 1.

11. The motor vehicle according to claim 10, wherein the motor vehicle is an autonomous motor vehicle.

12. A control method for controlling the motor vehicle according to claim 10, comprising a braking control step, wherein during the braking control step:

when a failure of the main braking circuit is detected, the first electronic control device applies a step of emergency control of the first electric actuator and the second electronic control device applies a step of emergency control of the second electric actuator.

13. A control method for controlling the motor vehicle according to claim 10, comprising a braking control step, wherein during the braking control step:

when a failure of the first electronic control device is detected, the second electronic control device applies a step of emergency control of the first electric actuator, when a failure of the second electronic control device is detected, the first electronic control device applies a step of emergency control of the second electric actuator.

14. A control method for controlling the braking system according to claim 1, comprising a braking control step, wherein during the braking control step:

when a failure of the main braking circuit is detected, the first electronic control device applies a step of emergency control of the first electric actuator and the second electronic control device applies a step of emergency control of the second electric actuator.

15. A control method for controlling the braking system according to claim 1, comprising a braking control step, wherein during the braking control step:

when a failure of the first electronic control device is detected, the second electronic control device applies a step of emergency control of the first electric actuator, when a failure of the second electronic control device is detected, the first electronic control device applies a step of emergency control of the second electric actuator.

* * * * *